US010872399B2

(12) United States Patent
Li et al.

(10) Patent No.: US 10,872,399 B2
(45) Date of Patent: Dec. 22, 2020

(54) PHOTOREALISTIC IMAGE STYLIZATION USING A NEURAL NETWORK MODEL

(71) Applicant: NVIDIA Corporation, Santa Clara, CA (US)

(72) Inventors: Yijun Li, San Jose, CA (US); Ming-Yu Liu, Sunnyvale, CA (US); Ming-Hsuan Yang, Sunnyvale, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 90 days.

(21) Appl. No.: 16/246,375

(22) Filed: Jan. 11, 2019

(65) Prior Publication Data

US 2019/0244329 A1 Aug. 8, 2019

Related U.S. Application Data

(60) Provisional application No. 62/625,730, filed on Feb. 2, 2018.

(51) Int. Cl.
*G06T 5/00* (2006.01)
*G06T 7/11* (2017.01)
(Continued)

(52) U.S. Cl.
CPC ............. *G06T 5/002* (2013.01); *G06N 3/088* (2013.01); *G06T 7/11* (2017.01)

(58) Field of Classification Search
None
See application file for complete search history.

(56) References Cited

U.S. PATENT DOCUMENTS 8,917,284 B2 * 12/2014 Finch ............... G06T 11/203
345/442
10,213,692 B2 * 2/2019 Velic ................... A63F 13/213
(Continued)

OTHER PUBLICATIONS

Luan, Fujun, et al. "Deep photo style transfer." Proceedings of the IEEE Conference on Computer Vision and Pattern Recognition. 2017. (Year: 2017).*

(Continued)

*Primary Examiner* — Michelle M Entezari
(74) *Attorney, Agent, or Firm* — Leydig, Voit & Mayer, Ltd.

(57) ABSTRACT

Photorealistic image stylization concerns transferring style of a reference photo to a content photo with the constraint that the stylized photo should remain photorealistic. Examples of styles include seasons (summer, winter, etc.), weather (sunny, rainy, foggy, etc.), lighting (daytime, nighttime, etc.). A photorealistic image stylization process includes a stylization step and a smoothing step. The stylization step transfers the style of the reference photo to the content photo. A photo style transfer neural network model receives a photorealistic content image and a photorealistic style image and generates an intermediate stylized photorealistic image that includes the content of the content image modified according to the style image. A smoothing function receives the intermediate stylized photorealistic image and pixel similarity data and generates the stylized photorealistic image, ensuring spatially consistent stylizations.

17 Claims, 17 Drawing Sheets

(51) Int. Cl.
G06N 3/00 (2006.01)
G06N 3/08 (2006.01)

(56) References Cited

U.S. PATENT DOCUMENTS

| | | | | |
|---|---|---|---|---|
| 10,242,292 | B2* | 3/2019 | Zisimopoulos | G06N 20/00 |
| 10,311,326 | B2* | 6/2019 | Amitay | G06K 9/6215 |
| 10,565,757 | B2* | 2/2020 | Oxholm | G06N 3/0454 |
| 10,607,393 | B2* | 3/2020 | Petkov | A61B 6/037 |
| 10,623,709 | B2* | 4/2020 | Schroers | G06T 5/50 |
| 10,657,676 | B1* | 5/2020 | Rehfeld | G06N 3/0454 |
| 10,658,005 | B1* | 5/2020 | Bogan, III | G06K 9/6256 |
| 10,679,046 | B1* | 6/2020 | Black | G06N 3/084 |
| 2009/0315910 | A1* | 12/2009 | Kambhamettu | G06T 7/11 345/589 |
| 2018/0253865 | A1* | 9/2018 | Price | G06N 3/084 |
| 2018/0357259 | A1* | 12/2018 | Jin | G06F 16/532 |
| 2018/0373999 | A1* | 12/2018 | Xu | G06N 3/0454 |
| 2020/0082249 | A1* | 3/2020 | Hua | G06T 11/001 |

OTHER PUBLICATIONS

Ledig, Christian, et al. "Photo-realistic single image super-resolution using a generative adversarial network." Proceedings of the IEEE conference on computer vision and pattern recognition. 2017. (Year: 2017).*
Li, Yijun, et al. "A closed-form solution to photorealistic image stylization." Proceedings of the European Conference on Computer Vision (ECCV). 2018. (Year: 2018).*
Li, Yanghao, et al. "Demystifying neural style transfer." arXiv preprint arXiv:1701.01036 (2017). (Year: 2017).*
Li et al, "Universal style transfer via feature transforms," NIPS, 2017, 11 pages.
Luan et al., "Deep photo style transfer," CVPR, 2017, 9 pages. Retrieved from https://arxiv.org/pdf/1703.07511.pdf.
Li et al., "A Closed-form Solution to Photorealistic Image Stylization," Conference on Computer Vision and Pattern Recognition, 2018, 23 pages. Retrieved from https://arxiv.org/pdf/1802.06474.pdf.
Bae, S., et al., "Two-scale ton management for photographic look," ACM Transactions on Graphics, 25(3):637-645, 2006.
Dumoulin, V., et al., "A learned representation for artistic style," in ICLR 2017, 26 pages.
Freedman, D., et al., "Object-to-object color transfer: Optimal flows and smsp transformations," In CVPR, 2010, 8 pages.
Gatys, L.A., et al., "Texture synthesis using convolutional neural networks," In NIPS, 2015, 10 pages.
Gatys, L.A., et al., "Image style transfer using convolutional neural networks," In CVPR, 2016, 10 pages.
Gatys, L.A., et al., "Controlling perceptual factors in neural style transfer," In CVPR, 2017, 9 pages.
Ghiasi, G., et al., "Exploring the structure of a real-time, arbitrary neural artistic stylization network," In BMVC, 2017, 27 pages.
Huang, X., et al., "Arbitrary style transfer in real-time with adaptive instance normalization," In ICCV, 2017, 11 pages.
Isola, P., et al., "Image-to-image translation with conditional adversarial networks," In CVPR, 2017, 17 pages.
Johnson, J., et al., "Perceptual losses for real-time style transfer and super-resolution," In ECCV, 2016, 17 pages.
Laffont, P.Y., et al., "Transient attributes for high-level understanding and editing of outdoor scenes," ACM Transactions on Graphics, 33(4):149, 2014, 11 pages.
Levin, A., et al., "A closed-form solution to natural image matting," PAMI, 30(2):228-242, 2008.
Li, C., et al., "Combining markov random fields and convolutional neural networks for image synthesis," In CVPR, 2016, 9 pages.
Li., S., et al., "Laplacian-steered neural style transfer," In ACM MM, 2017, 9 pages.
Li, Y., et al., "Diversified texture synthesis with feed-forward networks," In CVPR, 2017, 11 pages.
Lin, T.Y., et al., "Microsoft COCO: Common objects in context," In ECCV, 2014, 15 pages.
Liu, M.Y., et al., "Unsupervised image-to-image translation networks," In NIPS, 2017, 32 pages.
Liu, M.Y., et al., "Coupled generative adversarial networks," in NIPS, 2016, 11 pages.
Mechrez, R., et al., "Photorealistic style transfer with screened poisson equation," In BMVC, 2017, 12 pages.
Noh, H., et la., "Learning deconvolution network for semantic segmentation," In ICCV 2015, 10 pages.
Pitie, F., et al., "N-dimensional probability density function transfer and its application to color transfer," In ICCV, 2005, 6 pages.
Reinhard, E., et al., "Color transfer between images," IEEE Computer Graphics and Applications, 21(5):34-41, 2001.
Shi, J., et al., "Normalized cuts and image segmentation," PAMI, 22(8):888-905, 2000.
Shih, Y., et al., "Style transfer for headshot portraits," In SIGGRAPH, 2014, 51 pages.
Shih, Y., et al., "Data-driven hallucination of different times of day from a single outdoor photo," In SIGGRAPH, 2013, 11 pages.
Shrivastava, A., et al., "Learning from simulated and unsupervised images through adversarial training," In CVPR, 2017, 16 pages.
Simonyan, K., et al., "Very deep convolutional networks for large-scale image recognition," In ICLR, 2015, 14 pages.
Sunkavalli, K., et al., "Multi-scale image harmonization," ACM Transactions on Graphics, 29(4):125, 2010.
Taigman, Y., et al., "Unsupervised cross-domain image generation," In ICLR, 2017, 14 pages.
Tsai, Y.H., et al., "Sky is not the limit: Semantic-aware sky replacement," ACM Transactions on Graphics, 35(4):149, 2016.
Ulyanov, D., et al., "Texture networks: Feed-forward synthesis of textures and stylized images," In ICML, 2016, 16 pages.
Wu, F., et al., "Content-based colour transfer," In Computer Graphics Forum, V. 32, pp. 190-203, 2013.
Xie, S., et al., "Holistically-nested edge detection," In ICCV, 2015, 10 pages.
Yang, C., et al., "Saliency detection via graph-based manifold ranking," In CVPR, 2013, 8 pages.
Zeiler, M.D., et al., "Visualizing and understanding convolutional networks," In ECCV, 2014, 4 pages.
Zelnik-Manor, L., et al., "Self-tuning spectral clustering," In NIPS, 2005, 8 pages.
Zhao, J., et al., "Stacked what-where auto-encoders," In ICLR Workshop, 2016, 12 pages.
Zhou, D., et al., "Ranking on data manifolds," In NIPS, 2004, 8 pages.
Zhu, J.Y., et al., "Unpaired image-to-image translation using cycle-consistent adversarial networks," In ICCV, 2017, 18 pages.
Cutzu, F., et al., "Estimating the photorealism of images: Distinguishing paintings from photographs," In CVPR, 2003, 8 pages.
Li, Q., Arnab, A. and Torr, P.H., 2018. Weakly-and semi-supervised panoptic segmentation. In proceedings of the European Conference on Computer Vision (ECCV) (pp. 102-118). (Year: 2018).

* cited by examiner

PHOTOREALISTIC IMAGE STYLIZATION USING A NEURAL NETWORK MODEL

CLAIM OF PRIORITY

This application claims the benefit of U.S. Provisional Application No. 62/625,730 titled "CLOSED-FORM SOLUTION TO PHOTOREALISTIC IMAGE STYLIZATION," filed Feb. 2, 2018, the entire contents of which are incorporated herein by reference.

TECHNICAL FIELD

The present disclosure relates to photorealistic images, and more particularly to transferring a style of a reference photo to a content photo to produce a photorealistic image.

BACKGROUND

Photorealistic image stylization concerns transferring style of a reference photo to a content photo with the constraint that the stylized photo should remain photorealistic. Examples of styles include seasons (summer, winter, etc.), weather (sunny, rainy, foggy, etc.), lighting (daytime, nighttime, etc.). Artistic stylization techniques that convert images to paintings, without preserving photorealism, often introduce structural artifacts and distortions when used for photorealistic image stylization. Conventional photorealistic image stylization techniques tend to generate spatially inconsistent stylizations with noticeable artifacts. There is a need for addressing these issues and/or other issues associated with the prior art.

SUMMARY

A photorealistic image stylization technique includes a stylization step and a smoothing step. While the stylization step transfers the style of the reference photo to the content photo, the smoothing step ensures spatially consistent stylizations. Each of the steps has a closed-form solution and can be computed efficiently. The stylization step is based on a whitening and coloring transform (WCT) and the smoothing step is based on a manifold ranking algorithm. The stylization step and the smoothing step are independent and may be used with other smoothing and stylization techniques, respectively.

A method, computer readable medium, and system are disclosed for performing image stylization. A photorealistic content image and a photorealistic style image are processed by a max pooling layer of an encoder portion of a photo style transfer neural network model to generate location data identifying a location within a feature map of a maximum value output by the max pooling layer. An output of the encoder portion is processed by a unpooling layer of a decoder portion of the photo style transfer neural network model based on the location data to produce a stylized photorealistic image including content from the photorealistic content image that is modified according to the photorealistic style image.

DETAILED DESCRIPTION

Photorealistic image stylization concerns transferring style of a reference photo to a content photo with the constraint that the stylized photo should remain photorealistic. While several photorealistic image stylization methods exist, they tend to generate spatially inconsistent stylizations with noticeable artifacts.

Photorealistic image stylization is related to the image-to-image translation problem where the goal is to learn to translate an image from one domain to another. However, photorealistic image stylization does not require a training dataset of content and style images for learning the translation function. Photorealistic image stylization can be considered as a special kind of image-to-image translation. Not only can photorealistic image stylization be used to translate a photo to a different domain (e.g., from day to night-time) but also transfer style (e.g., extent of darkness) of a specific reference image to the content image.

In an embodiment, the photorealistic image stylization technique described herein includes a stylization step and a smoothing step. The stylization step transfers the style of the reference photo to the content photo, the smoothing step ensures spatially consistent stylizations. Each of the steps has a closed-form solution and can be computed efficiently.

In the context of the following description, a closed-form solution means that the solution can be obtained in a fixed number of operations, including convolutions, max-pooling, whitening, etc. The stylization step is based on the whitening and coloring transform (WCT) and the smoothing step is based on a manifold ranking algorithm. The stylization step and the smoothing step are independent and may be used with other smoothing and stylization techniques, respectively. The photorealistic image stylization technique generates photorealistic stylized images faster than conventional techniques and, during testing, the photorealistic stylized images were more preferred by human subjects as compared to photorealistic images generated using conventional techniques.

Figure 1A:
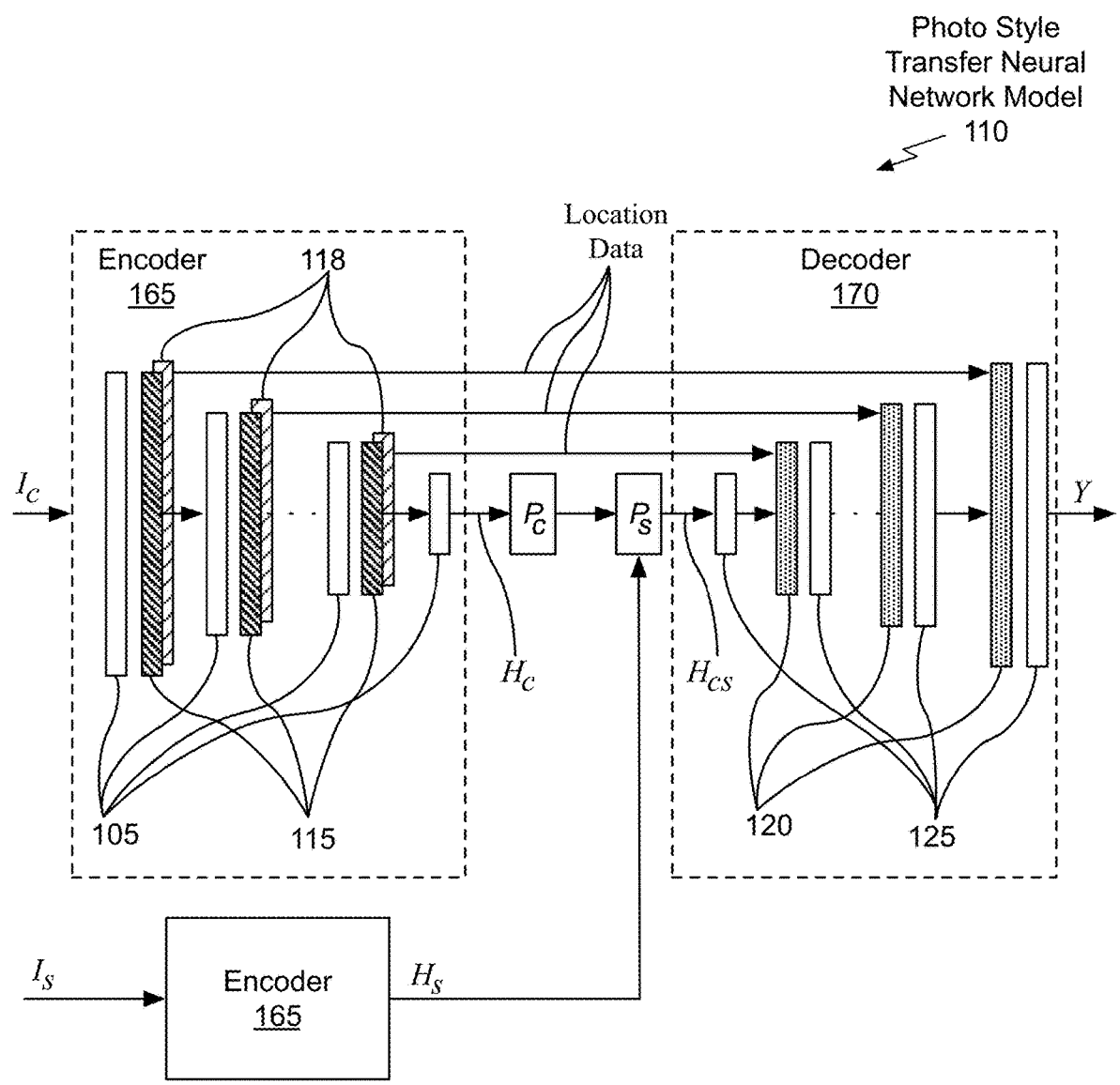
FIG. 1A illustrates a block diagram of photo style transfer neural network model, in accordance with an embodiment.
Figure 3:
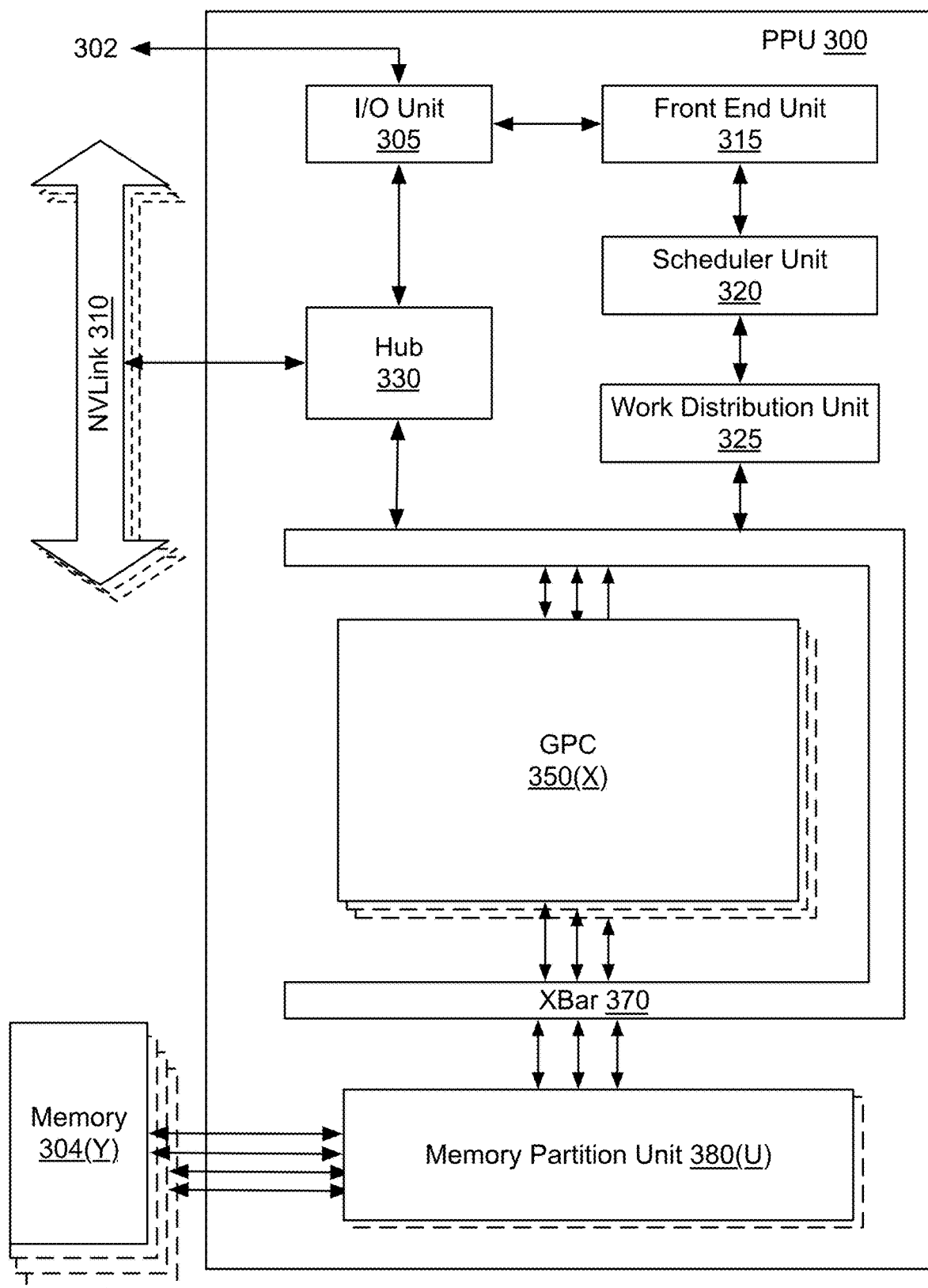
FIG. 3 illustrates a parallel processing unit, in accordance with an embodiment.

FIG. 1A illustrates a block diagram of photo style transfer neural network model 110, in accordance with an embodiment. The photo style transfer neural network model 110 includes two encoders 165, two feature projection modules, $P_C$ and $P_S$, and a decoder 170. The two projection function modules, $P_C$ and $P_S$ are inserted between the encoder 165 and decoder 170. Although the photo style transfer neural network model 110 is described in the context of processing units, one or more of the encoder, decoder, $P_C$ and $P_S$ may be performed by a program, custom circuitry, or by a combination of custom circuitry and a program. For example, the photo style transfer neural network model 110 may be implemented by a GPU (graphics processing unit), CPU (central processing unit), or any processor capable of implementing layers of a neural network. In an embodiment, parallel processing unit (PPU) 300 of FIG. 3 is configured to implement the photo style transfer neural network model 110. Furthermore, persons of ordinary skill in the art will understand that any system that performs the operations of the photo style transfer neural network model 110 is within the scope and spirit of embodiments of the present disclosure.

The photo style transfer neural network model 110 receives a photorealistic content image $I_C$ and a photorealistic style image $I_S$ and generates a stylized photorealistic image Y that includes the content of the content image modified according to the style image. The photo style transfer algorithm may be expressed as $$Y = \mathcal{F}_1(I_C, I_S). \quad (1)$$

The projection function modules, $P_C$ and $P_S$ each perform a projection based on features (parameters) received from respective encoders 165, namely $H_C$ and $H_S$.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
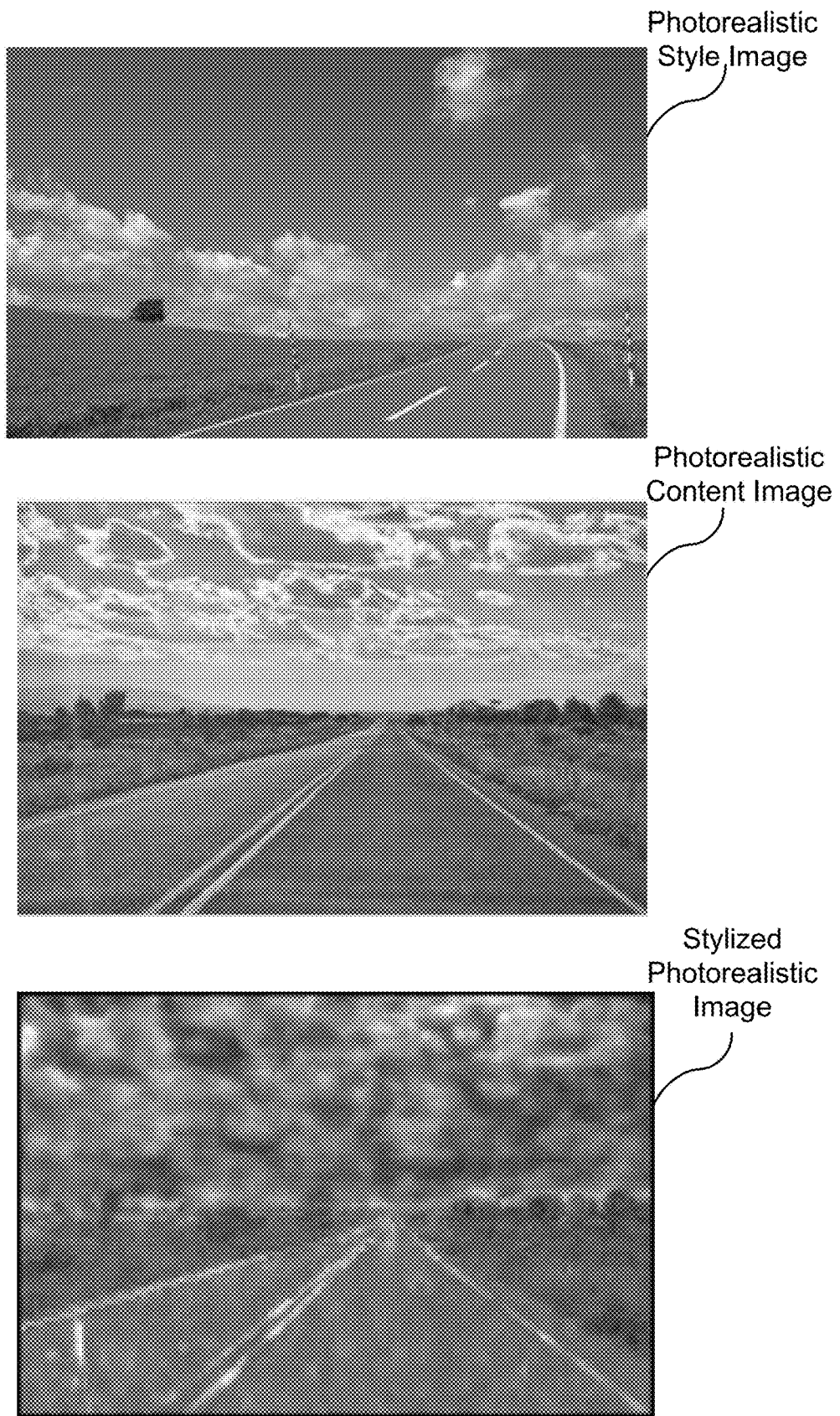
FIG. 1B illustrates a photorealistic style image, photorealistic content image, and stylized photorealistic image, in accordance with an embodiment.

FIG. 1B illustrates a style image, content image, and stylized photorealistic image, in accordance with an embodiment. The photorealistic style image $I_S$ is input to the encoder 165 and the photorealistic content image $I_C$ is input to the second encoder 165. The photorealistic style image and the photorealistic content image $I_C$ are processed by the photo style transfer neural network model 110 to produce the stylized photorealistic image Y. The cloud pattern in the photorealistic content image is retained in the stylized photorealistic image while a blue color of the sky and the green color of the landscape in the photorealistic style image appear in the stylized photorealistic image—the color of the sky and the landscape areas is changed compared with the photorealistic content image. The shape of the road in the stylized photorealistic image is consistent with the road in the photorealistic content image, while the color is changed to be similar to the road in the photorealistic style image. In addition to transferring color, the photo style transfer neural network model 110 may also be configured to synthesize patterns contained in the photorealistic content image, such as a cloud, snow, rain, and the like, in the stylized photorealistic image to be consistent with the content of the photorealistic content image.

Stylization is formulated as an image reconstruction problem with feature projections. Referring back to FIG. 1A, the encoders 165 and decoder 170 form an auto-encoder comprising an encoder 165 coupled directly to the decoder 170 (without the second encoder and projection modules $P_C$ and $P_S$) for general image reconstruction. In one embodiment, the encoder 165 implements a pre-trained VGG-19 convolutional neural network (the weights are kept fixed) and the decoder 170 is trained for reconstructing input images provided to the encoder 165. In an embodiment, the decoder 170 is symmetrical to the encoder 165. In an embodiment, the decoder 170 is trained by minimizing the sum of the $L_2$ reconstruction loss and perceptual loss.

Once the auto-encoder is trained, a second encoder 165 and the projection modules $P_C$ and $P_S$ are inserted at the network bottleneck between the encoders 165 and the decoder 170, as shown in FIG. 1A, to perform stylization using the whitening and coloring transform performed by the projection modules $P_C$ and $P_S$, respectively. The second encoder 165 is configured to use the same weights as the pre-trained encoder 165. In one embodiment (not shown), the second encoder 165 is omitted and a single encoder 165 is used to process $I_C$ and $I_S$ serially instead of in parallel.

The key idea behind the whitening and coloring transform is to directly match feature correlations of the content image to those of the style image via the two projections. Specifically, the encoder(s) 165 ($\varepsilon$) first extracts the vectorised VGG features for the photorealistic content image $I_C$ and the photorealistic style image $I_S$ producing $H_C = \varepsilon(I_C)$ and $H_S = \varepsilon(I_S)$, respectively, and the content feature $H_C$ is transformed via $$H_{CS} = P_S P_C H_C \quad (2)$$

where $$P_C = E_C \Lambda_C^{-\frac{1}{2}} E_C^T, \text{ and } P_S = E_S \Lambda_S^{\frac{1}{2}} E_S^T.$$

Here $\Lambda_C$ and $\Lambda_S$ are the diagonal matrices with the eigenvalues of the covariance matrix $H_C H_C^T$ and $H_S H_S^T$ respectively. The matrices $E_C$ and $E_S$ are the corresponding orthonormal matrices of the eigenvectors, respectively. After the transformation, the correlations of transformed features match those of the style features, i.e., $H_{CS} H_{CS}^T = H_S H_S^T$. Finally, the stylized image is obtained by directly feeding the transformed feature map $H_{CS}$ into the decoder 170 ($\mathcal{D}$): Y = $\mathcal{D}(H_{CS})$.

A conventional whitening and coloring transform (WCT) performs well for artistic image stylization. However, the conventional WCT generates structural artifacts (e.g., distortions on object boundaries) for photorealistic image stylization. The WCT, referred to as photoWCT, implemented by the photo style transfer neural network model 110 is designed to suppress the structural artifacts.

The photo style transfer neural network model 110 design is motivated by the observation that the max-pooling operation in an encoder portion of the conventional WCT reduces spatial information in feature maps processed within the encoder portion. The conventional decoder portion of the conventional WCT uses upsampling layers to enlarge the spatial resolutions of the feature maps within the decoder portion. Simply upsampling feature maps in the decoder portion fails to recover detailed structures of the input image that are lost when the max-pooling operation is performed in the encoder portion of the conventional WCT.

Therefore, in contrast with the conventional WCT, for the photoWCT implemented by the photo style transfer neural network model 110, the lost spatial information is passed from the encoder 165 to the decoder 170, as location data, to facilitate reconstructing the fine details. Each processing layer of the encoder 165 includes one or more convolutional layers 105, a max pooling layer 115 and a max pooling location layer 118. In an embodiment, only the location data for the photorealistic content image is passed from the encoder 165 to the decoder 170 and the max pooling layers 118 are omitted from the second encoder 165. In an embodiment, a final convolutional layer 105 of the encoder(s) 165 generates $H_C$ and $H_S$. Each processing layer of the decoder 170 includes one or more convolutional layers 125 and an unpooling layer 120. In an embodiment, a first convolutional layer 125 of the decoder 170 receives $H_{CS}$. To preserve spatial information, the PhotoWCT implemented by the photo style transfer neural network model 110 also replaces upsampling layers in the conventional WCT with the unpooling layers 120. The PhotoWCT function is formulated as $$Y = \mathcal{F}_1(I_C, I_S) = \mathcal{D}(P_S P_C H_C), \tag{3}$$

where $\mathcal{D}$ is the decoder 170, which contains the unpooling layers 120 and is trained for image reconstruction.

The unpooling layers 120 in the decoder 170 are used together with the location data generated by the max pooling location layers 118 to construct the stylized photorealistic image. In an embodiment, the location data is a max pooling mask which records where carries the maximum over each max pooling region in the corresponding max pooling layer 115. In an embodiment, the max pooling mask is a single bit for each feature, where a bit is set for the maximum value in each max pooling region.

Figure 1C:
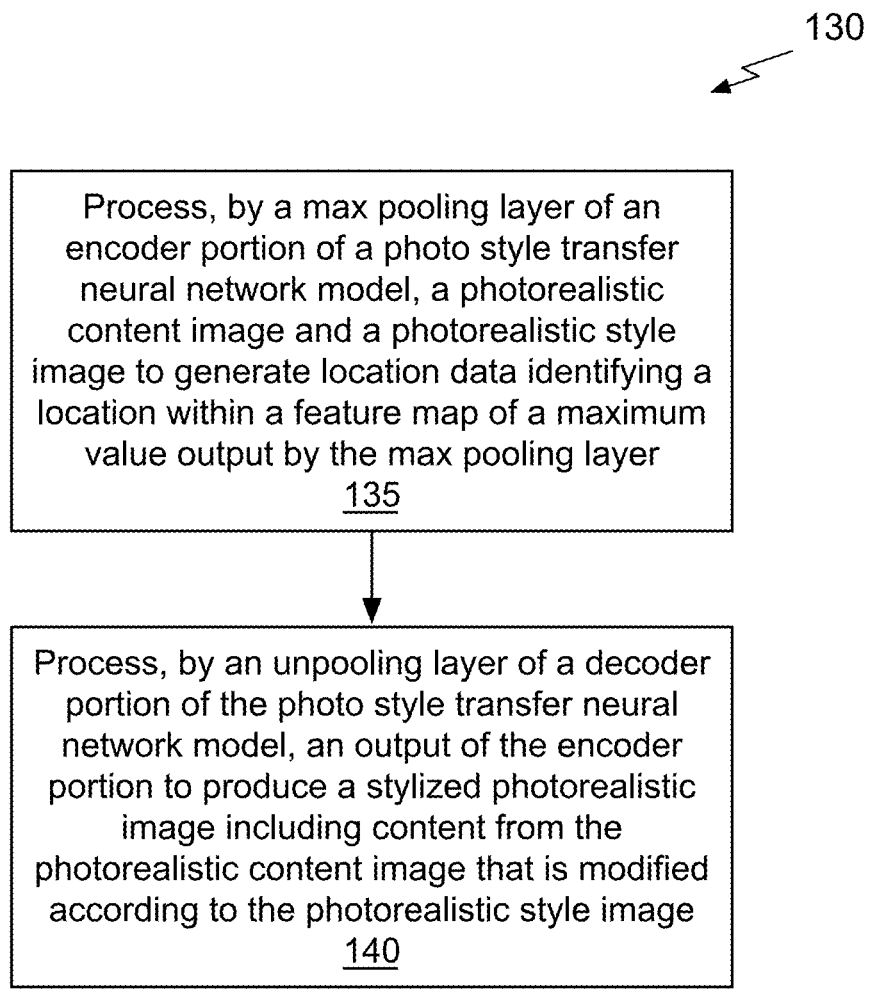
FIG. 1C illustrates a flowchart of a method for stylizing a photorealistic image, in accordance with an embodiment.

FIG. 1C illustrates a flowchart of a method 130 for stylizing a photorealistic image, in accordance with an embodiment. Although method 130 is described in the context of a processing unit, the method 130 may also be performed by a program, custom circuitry, or by a combination of custom circuitry and a program. For example, the method 130 may be executed by a GPU (graphics processing unit), CPU (central processing unit), or any processor capable of implementing a neural network model. Furthermore, persons of ordinary skill in the art will understand that any system that performs method 130 is within the scope and spirit of embodiments of the present disclosure.

At step 135, a max pooling layer 115 of the encoder 165 within the photo style transfer neural network model 110 processes a photorealistic content image and a photorealistic style image to generate the location data identifying a location within a feature map of a maximum value output by the max pooling layer 115. In an embodiment, the location data for each layer in the encoder 165 is provided to a corresponding layer in the decoder 170, as shown in FIG. 1A.

At step 140, an unpooling layer 120 of the decoder 170 of the photo style transfer neural network model 110 processes an output of the encoder 165 to produce the stylized photorealistic image Y. The stylized photorealistic image includes content from the photorealistic content image that is modified according to the photorealistic style image. In an embodiment, the location data is generated by a max pooling location layers 118 corresponding to the max pooling layer 115, and is used by the unpooling layer 120 to produce the stylized photorealistic image. In an embodiment, the output of the encoder 165 is at least one of $H_C$ and $H_S$. In an embodiment, the output of the encoder 165 is further processed to provide $H_{CS}$ to the decoder 170.

Given a photorealistic style image $I_S$, the style transfer neural network model 110 ($\mathcal{F}_1$) transfers the style of $I_S$ to the photorealistic content photo $I_C$ while minimizing structural artifacts in the output stylized photorealistic image Y. In an embodiment, the style is transferred using the photoWCT stylization transform. Although the style transfer neural network model 110 can faithfully stylize $I_C$, the style transfer neural network model 110 sometimes generates inconsistent stylizations in semantically similar regions. The stylized photorealistic image in FIG. 1B may look less like a photo where semantically similar regions are stylized inconsistently. A photorealistic smoothing function $\mathcal{F}_2$ may be used to reduce or eliminate the artifacts. In an embodiment, a two-step mapping function performs stylization and smoothing:

$$\mathcal{F}_2(\mathcal{F}_1(I_C, I_S), I_C). \tag{4}$$

Figure 1D:
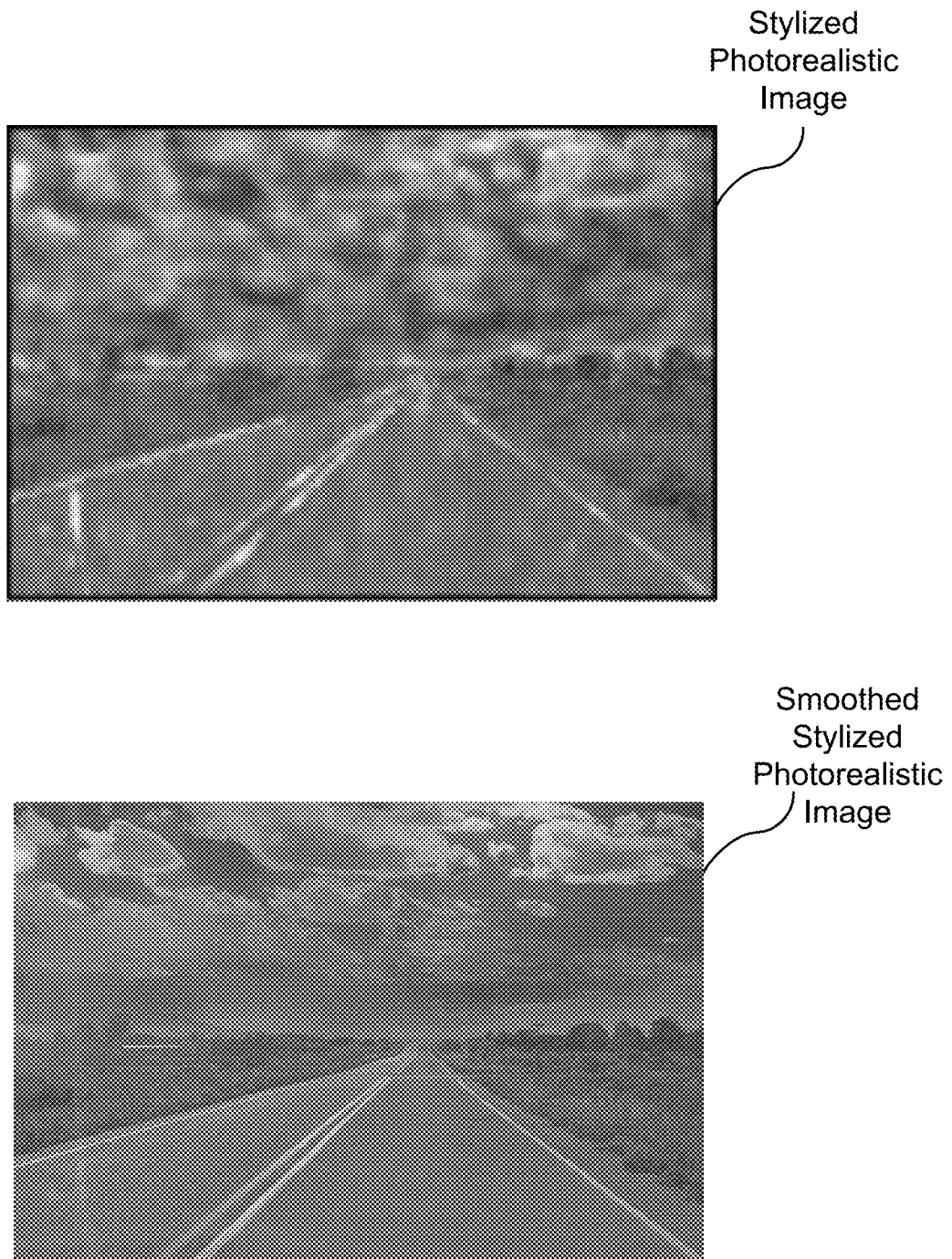
FIG. 1D illustrates the stylized photorealistic image and a smoothed stylized photorealistic image, in accordance with an embodiment.

In an embodiment, pixel affinities may be used to improve photorealism during smoothing of the stylized photorealistic image. FIG. 1D illustrates the stylized photorealistic image and a smoothed stylized photorealistic image, in accordance with an embodiment. The smoothed stylized photorealistic image in FIG. 1D looks more like a photo than the stylized photorealistic image because semantically similar regions are smoothed based on pixel affinities for the photorealistic content image.

Figure 1E:
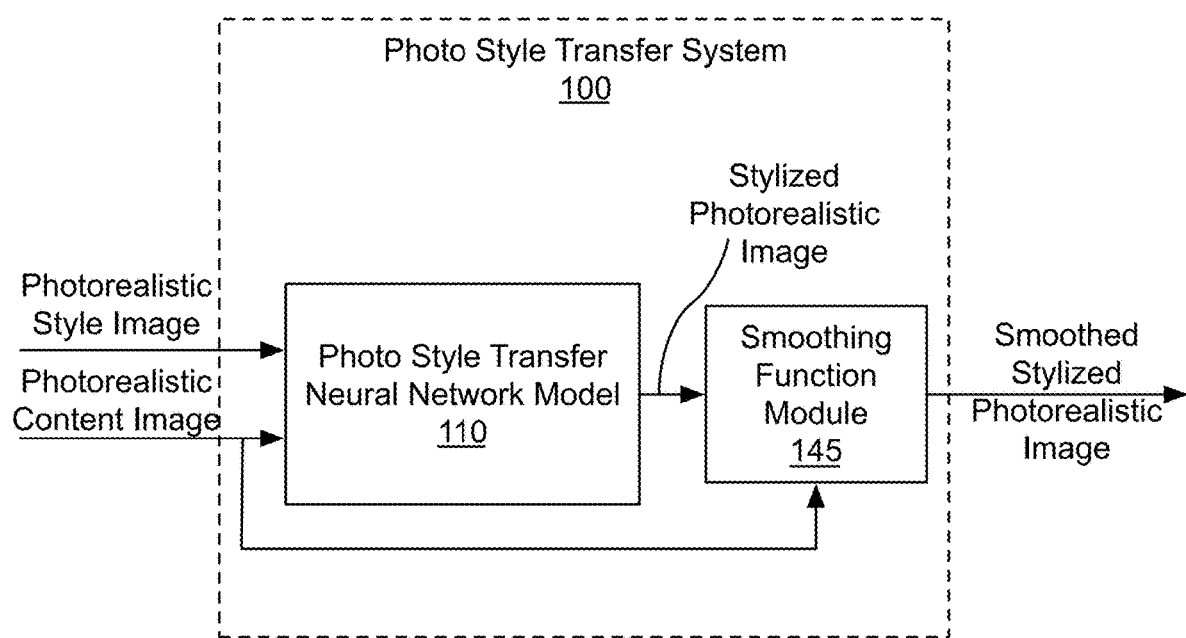
FIG. 1E illustrates a block diagram of a photo style transfer system, in accordance with an embodiment.

FIG. 1E illustrates a block diagram of a photo style transfer system 100, in accordance with an embodiment. The smoothing function module 145 ($\mathcal{F}_2$) receives the stylized photorealistic image Y and the photorealistic content image and generates a smoothed stylized photorealistic image. In an embodiment (as shown), the photorealistic content image is received by the smoothing function module 145 and is used to generate the pixel similarity data. In an embodiment, the smoothing function module 145 receives the pixel similarity data. In an embodiment, the pixel similarity data is an affinity matrix for the content image.

The smoothing operation has two goals. First, pixels with similar content in a local neighborhood should be stylized similarly. Second, the output should not deviate significantly from the stylized photorealistic image generated by the style transfer neural network model 110 in order to maintain the global stylization effects. In an embodiment, all pixels may be represented as nodes in a graph and an affinity matrix $W = \{w_{ij}\} \in \mathbb{R}^{N \times N}$ (N is the number of pixels) is defined to describe pixel similarities. A smoothness term and a fitting term are defined that model the two goals in the following optimization problem:

$$\arg\min_r 1/2 \left( \sum_{i,j=1}^{N} w_{ij} \left\| \frac{r_i}{\sqrt{d_{ii}}} - \frac{r_j}{\sqrt{d_{jj}}} \right\|^2 + \lambda \sum_{i=1}^{N} \|r_i - y_i\|^2 \right), \tag{5}$$

where $y_i$ is the pixel color in the stylized photorealistic image Y and $r_i$ is the pixel color in the desired smoothed stylized photorealistic image R. The variable $d_{ii}=\Sigma_j w_{ij}$ is the diagonal element in the degree matrix D of W, i.e., D=diag $\{d_{11}, d_{22}, \ldots, d_{NN}\}$. Equation (5) ensures that pixel values in the smoothed stylized photorealistic image resemble pixel values in the stylized photorealistic image Y (due to the second term, based on differences between $r_i$ and $y_i$), but the similarities resemble pixels in the photorealistic content image (due to the first term, based on pixel affinity values $w_{ij}$).

In equation (5), $\lambda$ controls the balance of the two terms. A smaller $\lambda$ renders smoother results, while a larger $\lambda$ renders results that are more faithful to the queries (the stylized photorealistic image Y). In general, decreasing $\lambda$ helps remove artifacts and hence improves photorealism. However, if $\lambda$ is too small, the smoothed stylized photorealistic image tends to be over-smoothed. In order to find the optimal $\lambda$, a grid search may be performed. In an embodiment, the similarity between boundary maps extracted from stylized and original content images may be used as a criteria for the grid search since object boundaries should remain the same despite the stylization.

The formulation shown in equation (5) is motivated by graph-based ranking algorithms. In the ranking algorithms, Y is a binary input where each element indicates if a specific item is a query ($y_i=1$ if $y_i$ is a query and $y_i=0$ otherwise). The optimal solution R is the ranking values of all the items based on their pairwise affinities. Y may be set as the stylized photorealistic image and the optimal solution R is the smoothed version of Y based on the pairwise pixel affinities, which encourages consistent stylization within semantically similar regions. The above optimization problem is a simple quadratic problem with a closed-form solution, which is given by $$R^* = (1-\alpha)(I-\alpha S)^{-1} Y, \qquad (6)$$

where I is the identity matrix, $$\alpha = \frac{1}{1+\lambda}$$

and S is the normalized Laplacian matrix computed from $I_C$, i.e., $S=D^{-1/2} W D^{-1/2} \in \mathbb{R}^{N \times N}$. As the constructed graph is often sparsely connected (i.e., most elements in W are zero), the inverse operation in equation (6) can be computed efficiently. With the closed-form solution, the smoothing step can be written as a function mapping given by:

$$R^* = \mathcal{F}_2(Y, I_C) = (1-\alpha)(I-\alpha S)^{-1} Y. \qquad (7)$$

In an embodiment, the affinity matrix W is computed using the photorealistic content image, based on an 8-connected image graph assumption. While several choices of affinity metrics exist, a popular one is to define the affinity (denoted as GaussianAff) as $$w_{ij} = e^{\frac{-\|I_i - I_j\|^2}{\sigma^2}}$$

where $I_i$, $I_j$ are the RGB values of adjacent pixels i,j and $\sigma$ is a global scaling hyper-parameter. However, in practice, it is difficult to determine the $\sigma$ value for the Gaussian Affinity that performs well globally. It often results in either over-smoothing the entire stylized photorealistic image or stylizing the photorealistic image inconsistently. In an embodiment, to avoid selecting one global scaling hyper-parameter, a matting affinity (denoted as MattingAff) is used where the affinity between two pixels is based on means and variances of pixels in a local window. The matting affinity is able to simultaneously smooth different regions well.

Figure 1F:
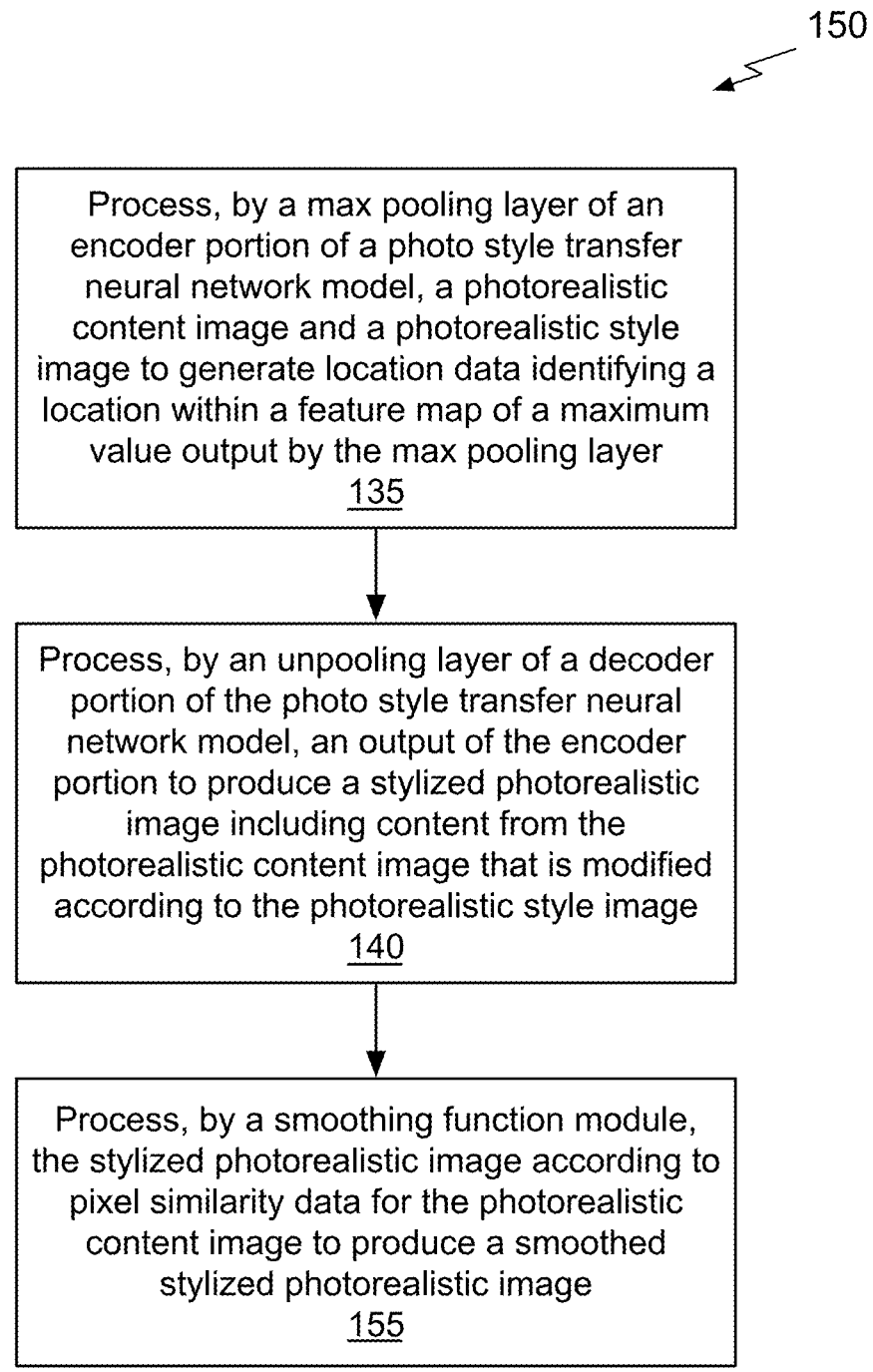
FIG. 1F illustrates a flowchart of a method for generating a smoothed stylized photorealistic image, in accordance with an embodiment.

FIG. 1F illustrates a flowchart of a method 150 for generating a smoothed stylized photorealistic image, in accordance with an embodiment. Although method 150 is described in the context of a processing unit, the method 150 may also be performed by a program, custom circuitry, or by a combination of custom circuitry and a program. For example, the method 150 may be executed by a GPU (graphics processing unit), CPU (central processing unit), or any processor capable of implementing a neural network model. Furthermore, persons of ordinary skill in the art will understand that any system that performs method 150 is within the scope and spirit of embodiments of the present disclosure.

Steps 135 and 140 are completed as previously described in conjunction with FIG. 1C. At step 155, the smoothing function module 145 processes the stylized photorealistic image generated by the photo style transfer neural network model 110 according to pixel similarity data for the photorealistic content image to produce a smoothed stylized photorealistic image.

The smoothing step $\mathcal{F}_2$ can be used to remove structural artifacts in stylized photorealistic images generated using the conventional WCT. However, applying the smoothing step $\mathcal{F}_2$ to stylized photorealistic images generated using the transfer step smoothing step $\mathcal{F}_1$ produces higher quality photorealistic images because the photorealistic content image and the conventional WCT stylized photorealistic image are severely misaligned due to spatial distortions. The misalignments may introduce wrong queries in Y for the smoothing step. Using the PhotoWCT to remove distortions before smoothing leads to better photorealism while still maintaining faithful stylization.

Figure 1G:
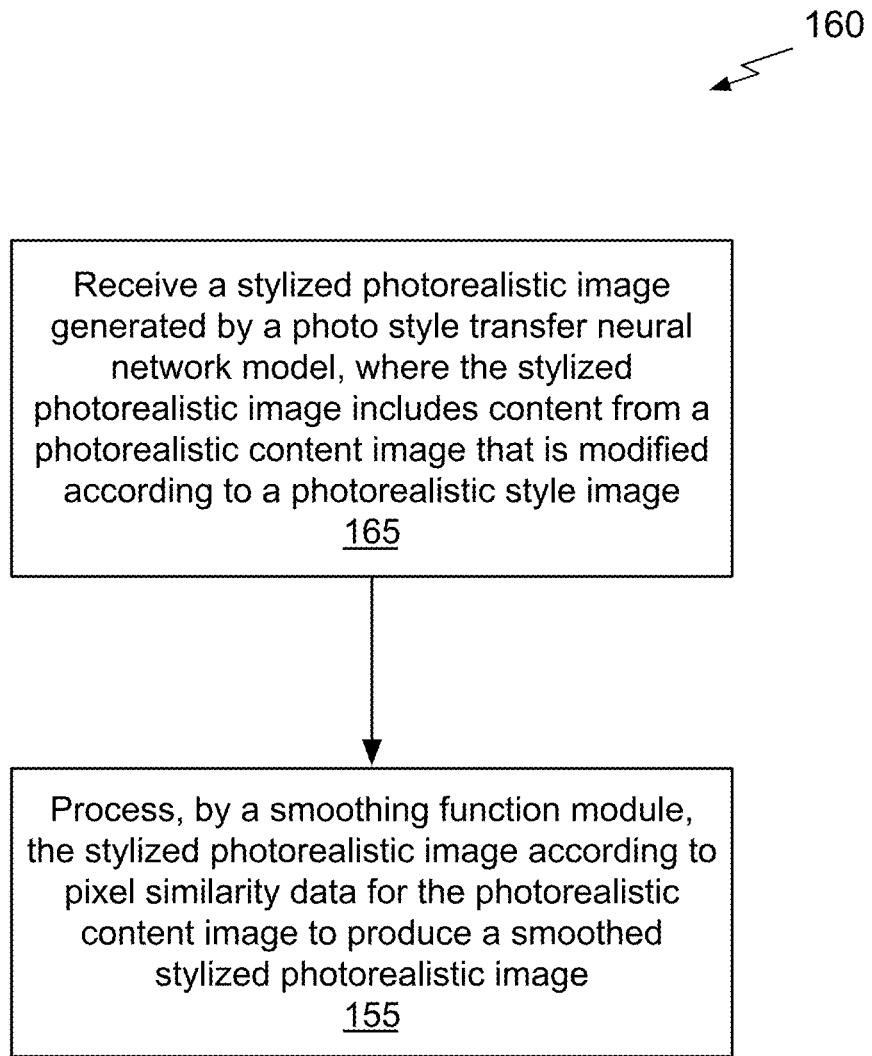
FIG. 1G illustrates a flowchart of another method for generating a smoothed stylized photorealistic image, in accordance with an embodiment.

FIG. 1G illustrates a flowchart of another method 160 for generating a smoothed stylized photorealistic image, in accordance with an embodiment. Although method 160 is described in the context of a processing unit, the method 160 may also be performed by a program, custom circuitry, or by a combination of custom circuitry and a program. For example, the method 160 may be executed by a GPU (graphics processing unit), CPU (central processing unit), or any processor capable of implementing the smoothing function module 145. Furthermore, persons of ordinary skill in the art will understand that any system that performs method 160 is within the scope and spirit of embodiments of the present disclosure.

At step 165 the smoothing function module 145 receives a stylized photorealistic image generated by a photo style transfer neural network model, where the stylized photorealistic image includes content from a photorealistic content image that is modified according to a photorealistic style image. In an embodiment, the photo style transfer neural network model is the photo style transfer neural network model 110 configured to implement photoWCT. In an embodiment, the stylized photorealistic image is produced using the conventional WCT to produce the stylized photorealistic image.

At step 155, the smoothing function module 145 processes the stylized photorealistic image according to pixel similarity data for the photorealistic content image to produce a smoothed stylized photorealistic image. In an embodiment, the pixel similarity data comprises pixel affinities that measure the likelihood of two neighboring pixels belonging to the same object. In an embodiment, the pixel similarity data identifies pixels in the stylized photorealistic image that are consistent in color with adjacent pixels. In an embodiment, the smoothing function module 145 processes the photorealistic content image to generate the pixel similarity data. In an embodiment, the smoothing function module 145 receives the pixel similarity data. In an embodiment, smoothing function implemented by the smoothing function module 145 is a closed-form solution. In an embodiment, the smoothing function module 145 solves a quadratic function with a closed-form solution to produce the smoothed stylized photorealistic image.

Figure 2A:
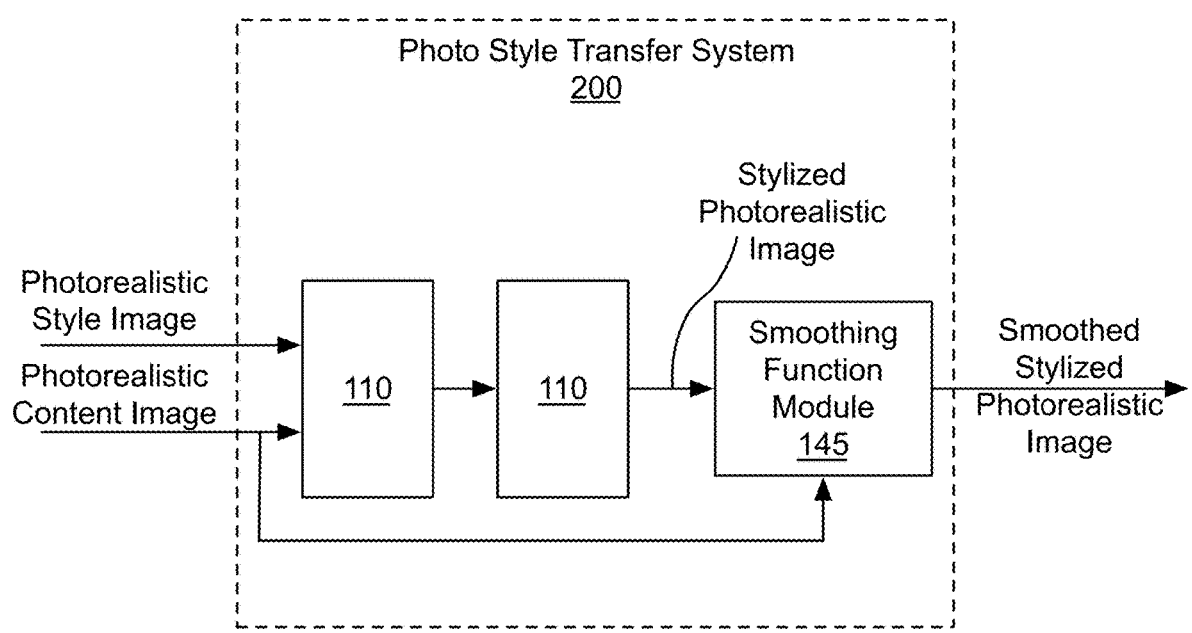
FIG. 2A illustrates a block diagram of another photo style transfer system, in accordance with an embodiment.

FIG. 2A illustrates a block diagram of another photo style transfer system 200, in accordance with an embodiment. The photo style transfer system 200 is a multi-level stylization system that includes multiple photo style transfer neural network models 110 that each include location layers and unpooling layers and the pair of feature transforms ($P_C$, $P_S$). Although two photo style transfer neural network models 110 are shown in FIG. 2A, more than two photo style transfer neural network models 110 may be configured in sequence to produce the stylized photorealistic image. A single smoothing function module 145 is used to process the final stylized photorealistic image generated by the multiple levels of stylization implemented by the sequence of photo style transfer neural network models 110. In an embodiment, each of the photo style transfer neural network models 110 may vary in terms of the number of layers in the encoder 165 and/or decoder 170. In an embodiment, the second photo style transfer neural network model 110 has lower feature representation compared with the first photo style transfer neural network model 110.

In an embodiment, four photo style transfer neural network models 110 are coupled in series to produce the photorealistic style image that is smoothed by the single smoothing function module 145. In an embodiment, the depth of the encoder 165 and decoder 170 within the four photo style transfer neural network models 110 decreases from the first of the four photo style transfer neural network models 110 to the fourth of the four photo style transfer neural network models 110. In an embodiment, the four decoders 170 are trained separately for image reconstruction and the four decoders 170 do not share weights.

Figure 2B:
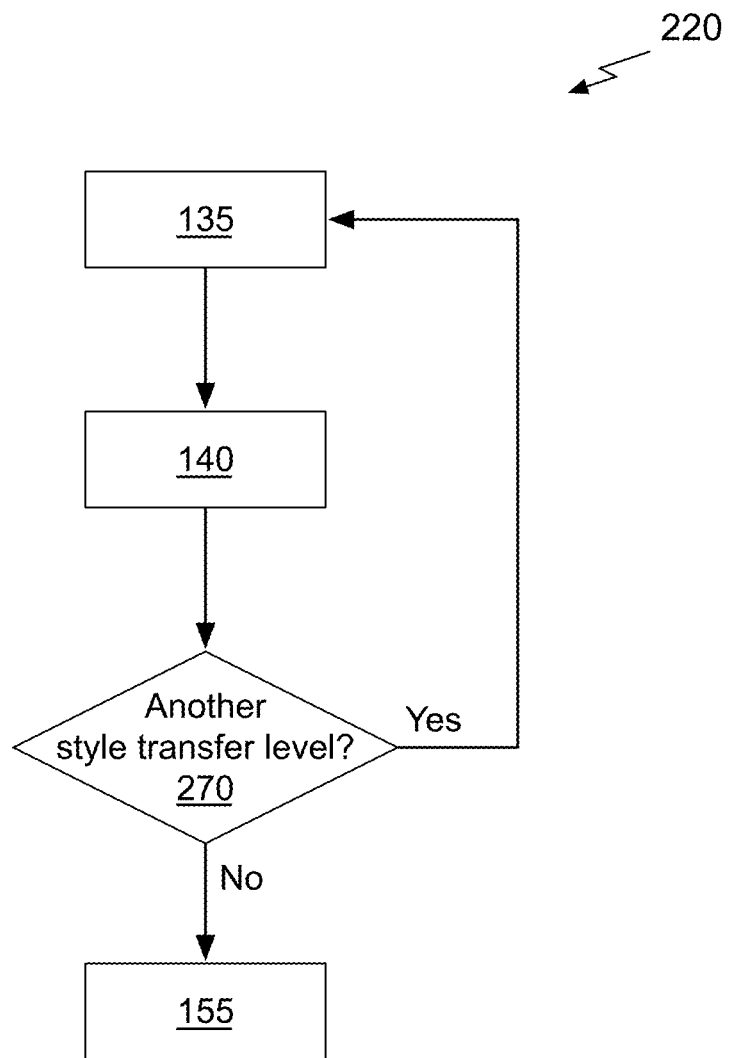
FIG. 2B illustrates a flowchart of a method for generating a smoothed stylized photorealistic image using the photo style transfer system of FIG. 2A, in accordance with an embodiment.

FIG. 2B illustrates a flowchart of a method 220 for generating a smoothed stylized photorealistic image using the photo style transfer system of FIG. 2A, in accordance with an embodiment. Although method 220 is described in the context of a processing unit, the method 220 may also be performed by a program, custom circuitry, or by a combination of custom circuitry and a program. For example, the method 220 may be executed by a GPU (graphics processing unit), CPU (central processing unit), or any processor capable of implementing a neural network model and a smoothing function. Furthermore, persons of ordinary skill in the art will understand that any system that performs method 220 is within the scope and spirit of embodiments of the present disclosure.

Steps 135 and 140 are completed as previously described in conjunction with FIG. 1C. The photo style transfer system 200 determines if another style transfer level should process the stylized photorealistic image, and, if so, steps 135 and 140 are repeated for another photo style transfer neural network model 110. Otherwise, at step 155, the smoothing function module 145 processes the stylized photorealistic image generated by the last photo style transfer neural network model 110 according to pixel similarity data for the photorealistic content image to produce a smoothed stylized photorealistic image.

The photo style transfer neural network 110 may be configured to leverage semantic label maps for obtaining better stylization results when semantic label maps are available for at least one of the photorealistic style image and the photorealistic content image. In an embodiment, when performing stylization, for each semantic label, a pair of projection matrices ($P_C$ and $P_S$) is computed using the features from the image regions with the same label in the photorealistic content and style photos, respectively. The pair is then used to stylize each of the image regions separately. With a semantic label map, content and style matching can be performed more accurately.

Figure 2C:
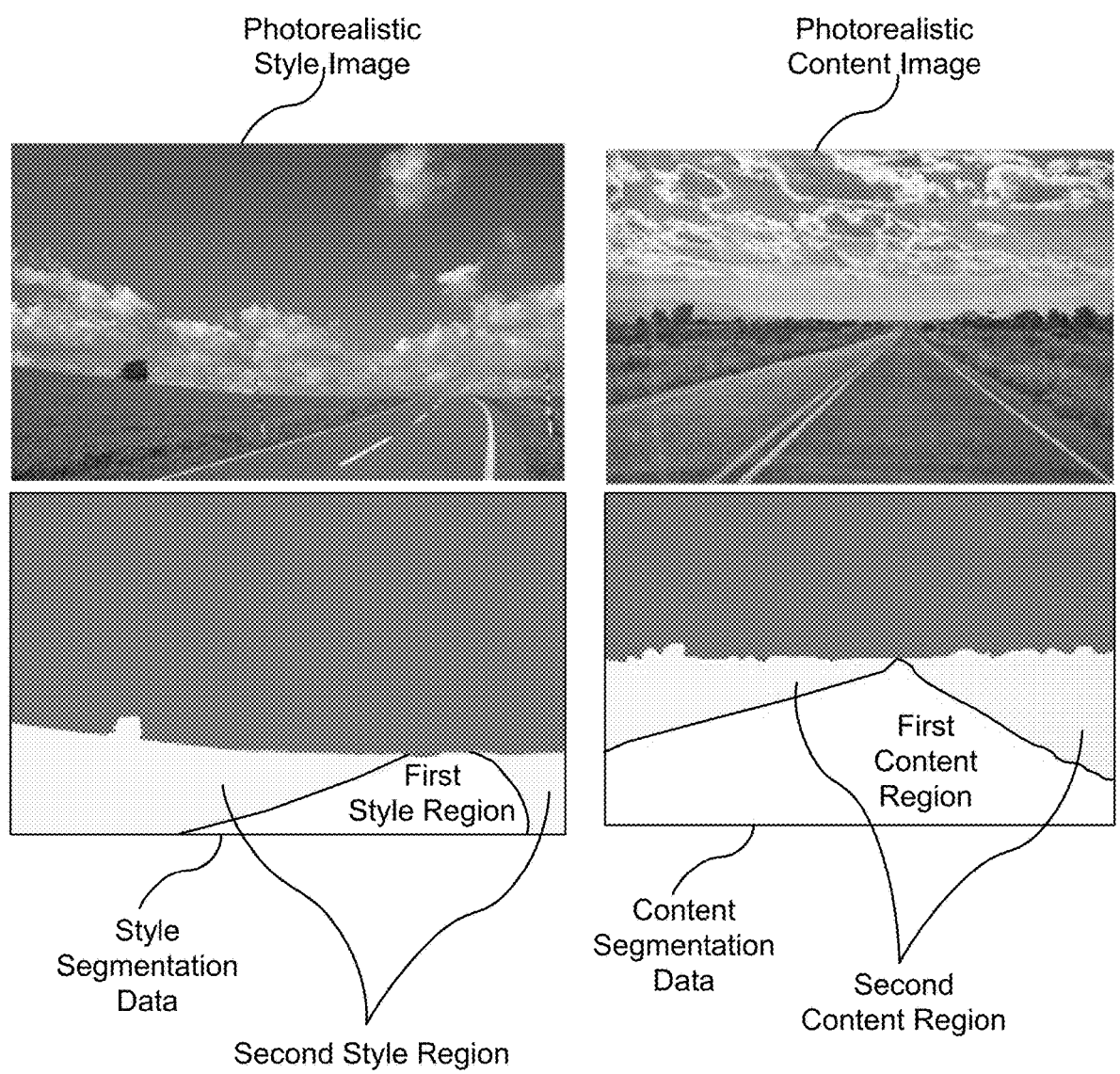
FIG. 2C illustrates a style image, a content image and corresponding style segmentation data and content segmentation data, respectively, in accordance with an embodiment.

FIG. 2C illustrates a photorealistic style image, a photorealistic content image and corresponding style segmentation data and content segmentation data, respectively, in accordance with an embodiment. In an embodiment, the style and/or content segmentation data is provided by semantic label maps. The photorealistic style image is segmented into a first style region and a second style region. The first style region in the style segmentation data identifies (i.e., is labeled as) the road and the second style region in the style segmentation data identifies the landscape. The photorealistic content image is segmented into a first content region and a second content region. The first content region in the content segmentation data identifies the road and corresponds with the first style region. The second content region in the content segmentation data identifies the landscape and corresponds with the second style region. The style and/or content segmentation data may define additional regions, such as the sky.

In an embodiment, the photo style transfer neural network model 110 processes the first style region identified by the style segmentation data and the corresponding first content region of the photorealistic content image to produce a first region of the photorealistic style image. In an embodiment, the photo style transfer neural network model 110 processes the first content region identified by the content segmentation data and a corresponding first style region of the photorealistic style image to produce a first region of the photorealistic style image.

Precise semantic label maps are not necessary for obtaining good stylization results. The semantic label maps are used only for finding matching areas between content and style images. The specific class information is not used. Additionally, the semantic label map need not be drawn precisely along object boundaries. The photorealistic smoothing step, which employs pixel affinities to encourage consistent stylization, can accommodate imprecise boundary annotations. Relaxing the precision of boundaries may greatly reduce the labeling burden for users.

Figure 2D:
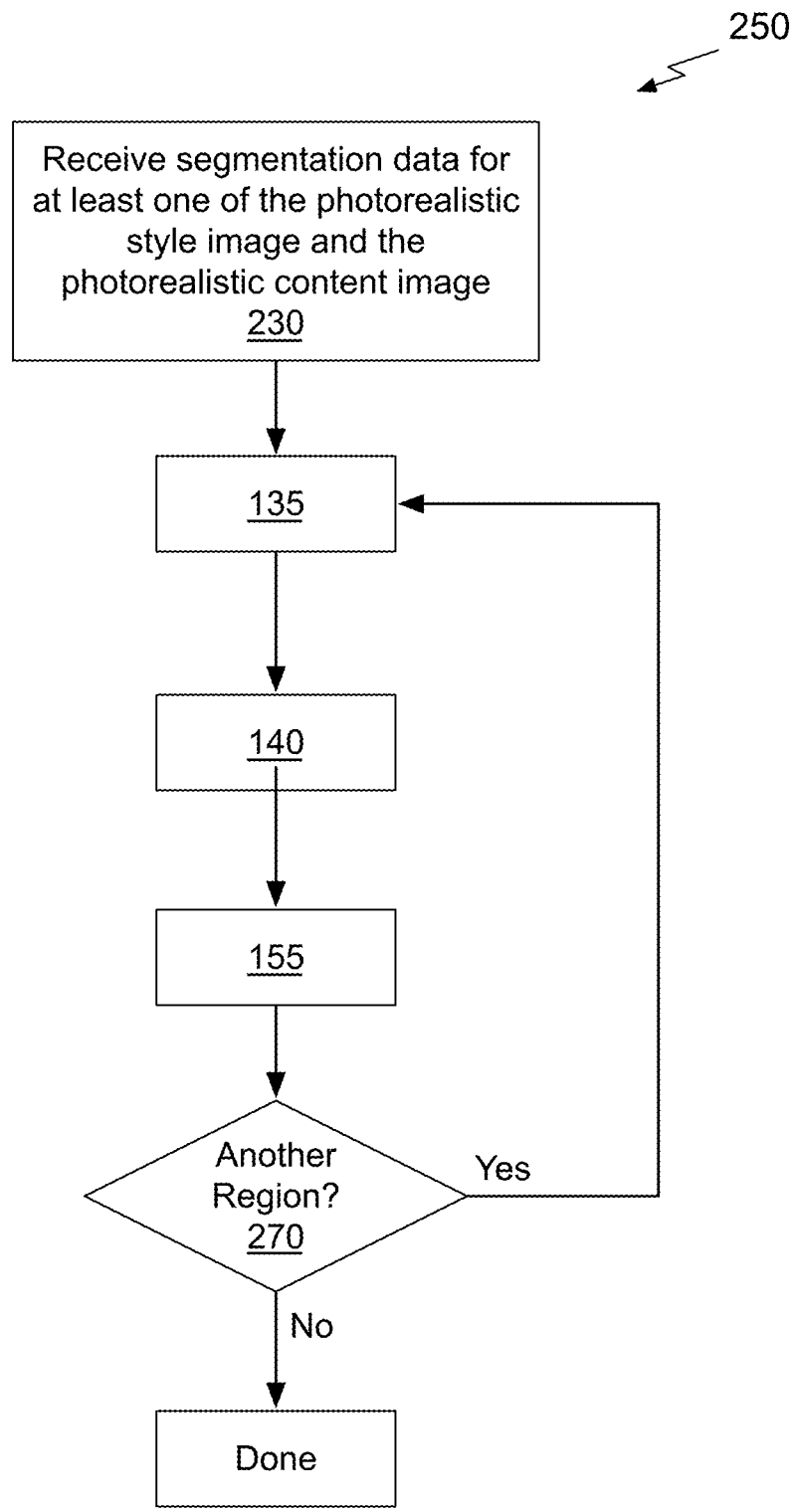
FIG. 2D illustrates a flowchart of a method for generating a smoothed stylized photorealistic image using segmentation data, in accordance with an embodiment.

FIG. 2D illustrates a flowchart of a method 250 for generating a smoothed stylized photorealistic image using segmentation data, in accordance with an embodiment. Although method 250 is described in the context of a processing unit, the method 250 may also be performed by a program, custom circuitry, or by a combination of custom circuitry and a program. For example, the method 250 may be executed by a GPU (graphics processing unit), CPU (central processing unit), or any processor capable of implementing a neural network model and a smoothing function. Furthermore, persons of ordinary skill in the art will understand that any system that performs method 250 is within the scope and spirit of embodiments of the present disclosure.

At step 230, segmentation data is received for at least one of the photorealistic style image and the photorealistic content image. In an embodiment, the segmentation data comprises a semantic label map. For a first region of the photorealistic content or style image identified by the segmentation data, steps 135, 140, and 155 are completed as previously described in conjunction with FIGS. 1C and 1F. At step 270, the photo style transfer system 100 or 200 determines if another region defined by the segmentation data should be processed, and, if so, steps 135, 140, and 155 are repeated for region. Otherwise, generation of the smoothed stylized photorealistic image is complete.

The photorealistic image stylization technique implemented by the photo style transfer neural network model 110 generates high quality stylized photorealistic images that are consistent with the photorealistic content image. Providing location data (max pooling masks) generated by each max pooling layer of the encoder 165 to corresponding unpooling layers in the decoder 170 ensures that fine details of the photorealistic content image may be retained. The photoWCT photorealistic image stylization technique has a closed-form solution and can be computed efficiently. The smoothing function improves the photorealism of the stylized images using pixel similarity data and also has a closed-form solution for efficient computation. The photorealistic image stylization technique and the smoothing function are independent and may be used with other smoothing and stylization techniques, respectively.

Parallel Processing Architecture

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
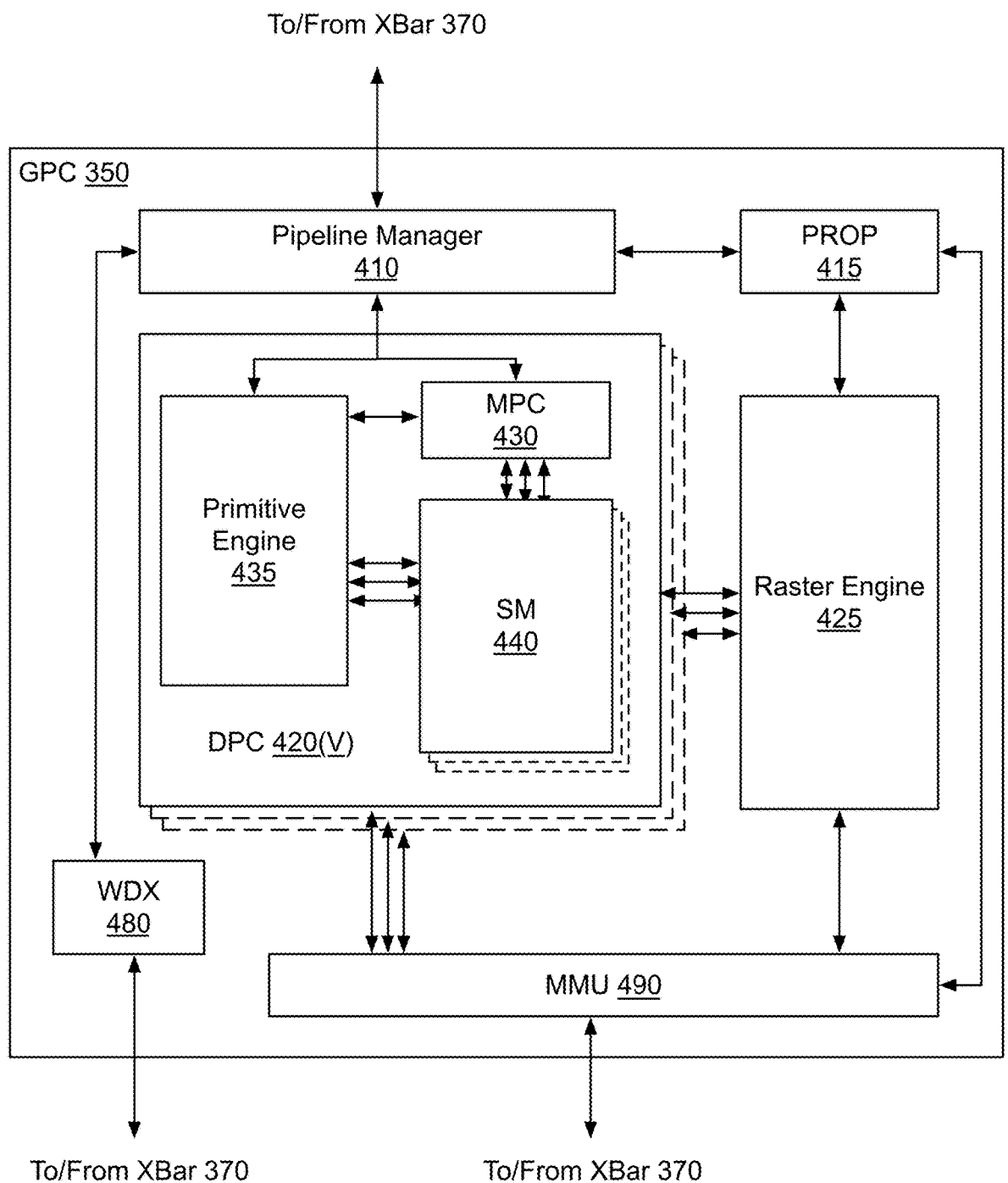
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
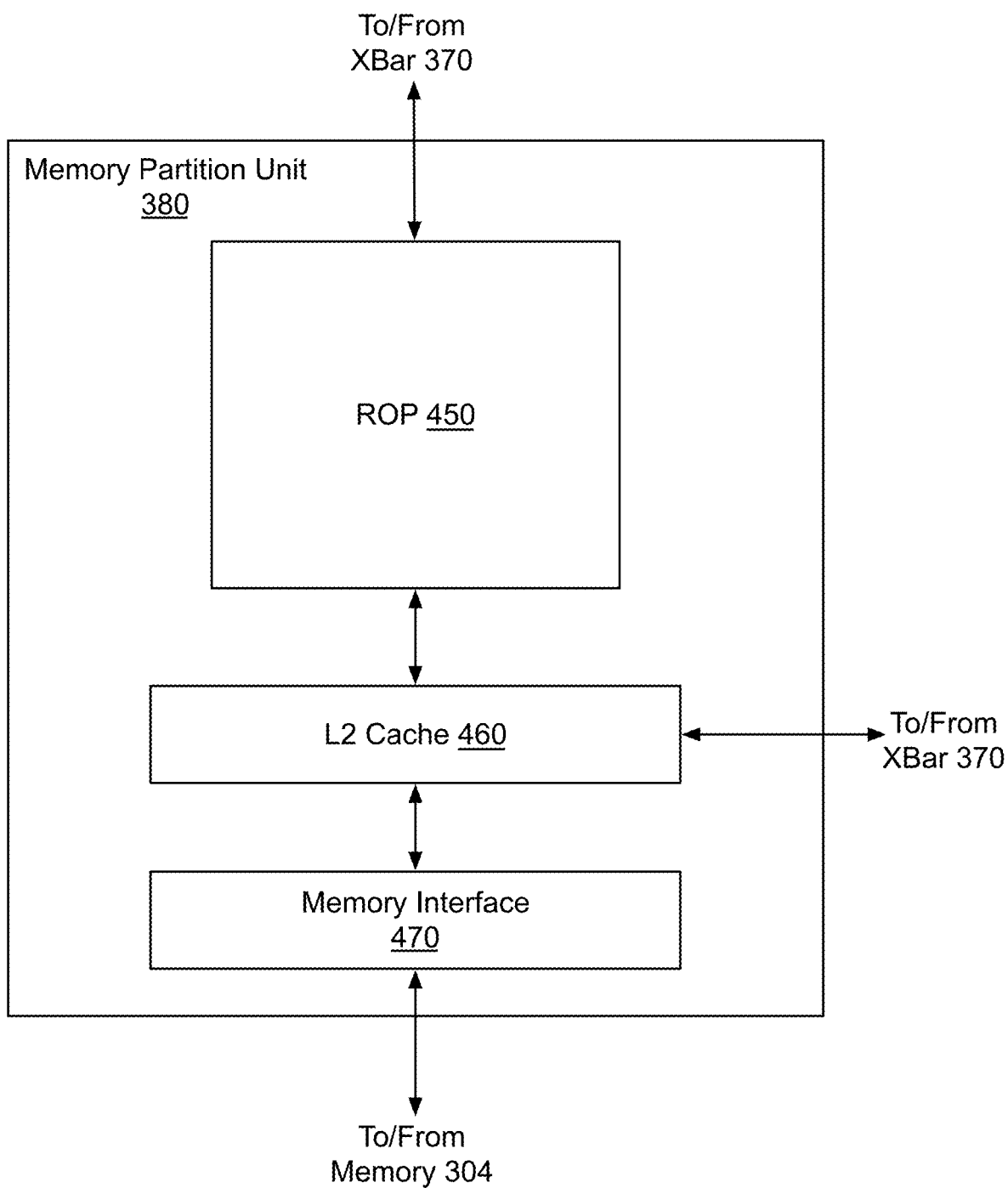
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
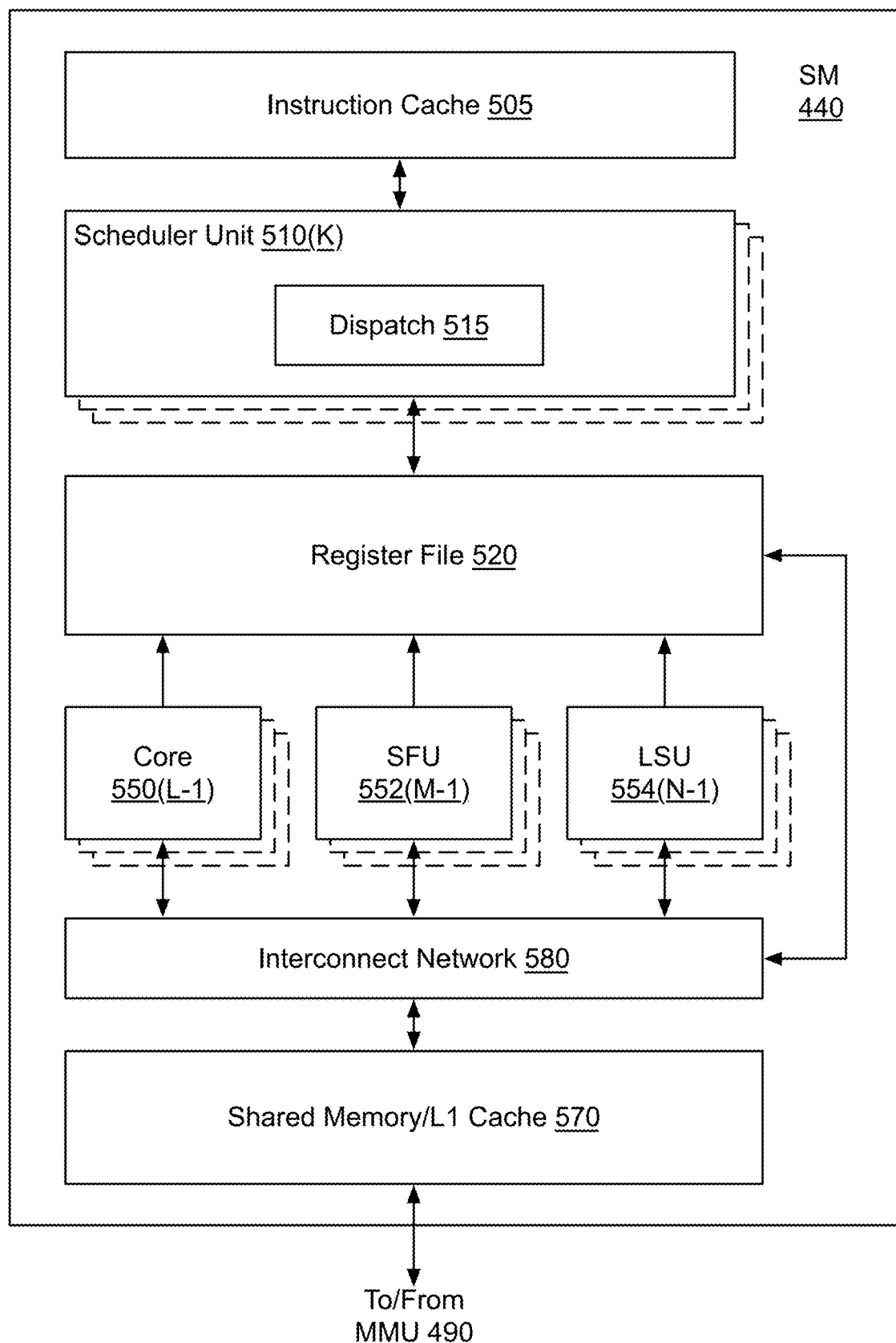
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
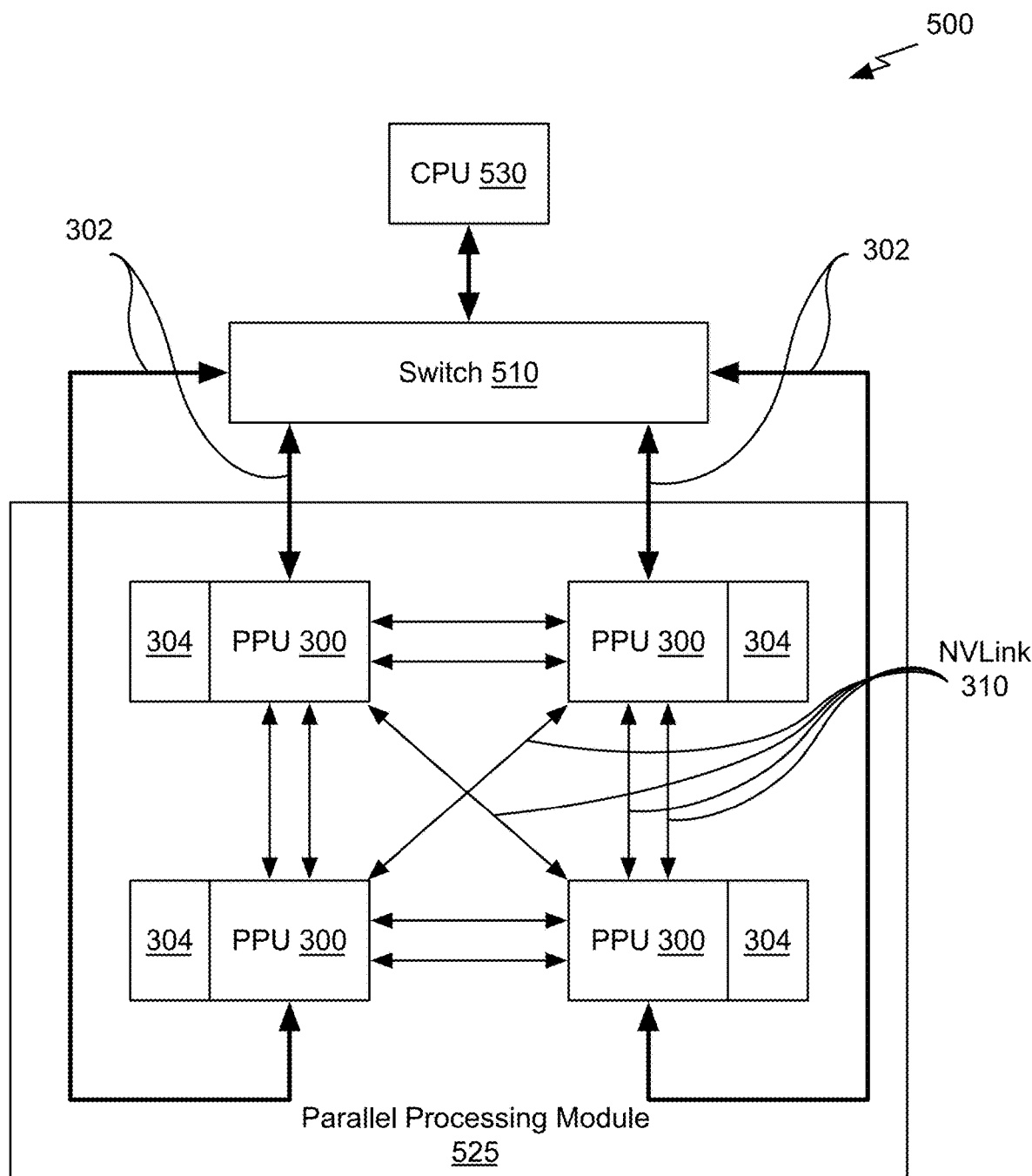
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the methods 130, 150, 160, 220, and 250 shown in FIGS. 1C, 1F, 1G, 2B, and 2D, respectively. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
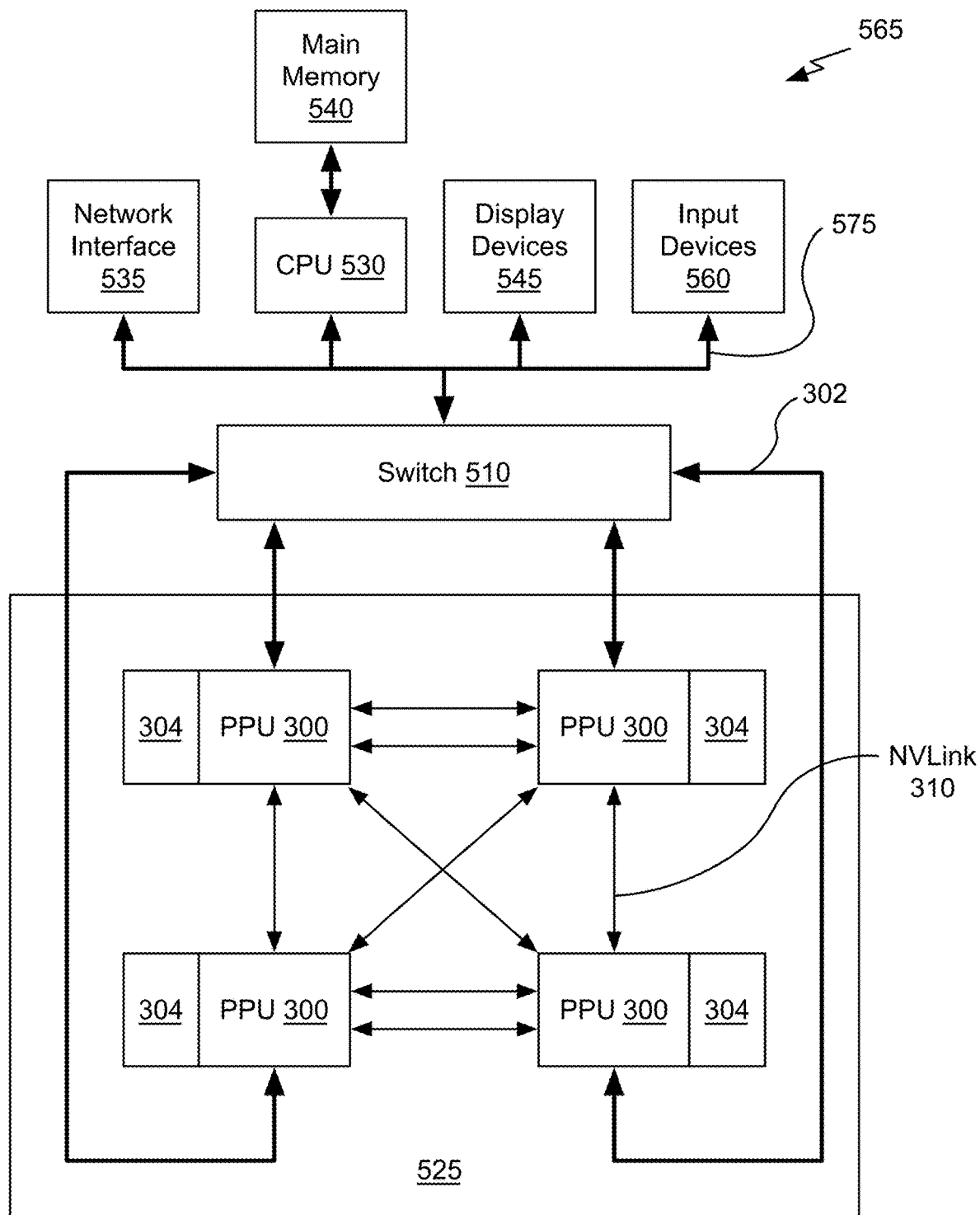
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the methods 130, 150, 160, 220, and 250 shown in FIGS. 1C, 1F, 1G, 2B, and 2D, respectively.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
    processing a photorealistic content image by a sequence of processing layers within an encoder portion of a photo style transfer neural network model to extract content features from the photorealistic content image, wherein each processing layer includes a max pooling layer that generates location data identifying a location of a maximum value of the content features output by the processing layer;
    processing an output of the encoder portion based on style features extracted from a photorealistic style image to produce a transformed feature map; and
    processing the transformed feature map by a sequence of decoder processing layers within a decoder portion of the photo style transfer neural network model to produce a stylized photorealistic image including content from the photorealistic content image that is modified according to the photorealistic style image, wherein an unpooling layer within each decoder processing layer uses the location data generated by a corresponding one of the max pooling layers to process the transformed feature map.

2. The computer-implemented method of claim 1, further comprising processing the stylized photorealistic image according to pixel similarity data for the photorealistic content image to produce a smoothed stylized photorealistic image.

3. The computer-implemented method of claim 2, wherein the pixel similarity data identifies pixels in the stylized photorealistic image that are consistent in color with adjacent pixels.

4. The computer-implemented method of claim 2, wherein a quadratic function with a closed-form solution is solved to produce the smoothed stylized photorealistic image.

5. The computer-implemented method of claim 2, wherein the pixel similarity data comprises pixel affinity values.

6. The computer-implemented method of claim 1, further comprising processing the photorealistic style image by a second photo style transfer neural network model to produce an improved photorealistic style image, wherein the second photo style transfer neural network model has lower feature representation compared with the photo style transfer neural network model.

7. The computer-implemented method of claim 1, wherein the photorealistic style image is segmented into a first style region and a second style region and the photo style transfer neural network model processes the first style region and a corresponding first content region of the photorealistic content image to produce a first region of the photorealistic style image.

8. The computer-implemented method of claim 1, wherein the photorealistic content image is segmented into a first content region and a second content region and the photo style transfer neural network model processes the first content region and a corresponding first style region of the photorealistic style image to produce a first region of the photorealistic style image.

9. A system, comprising a processor configured to implement a photo style transfer neural network model comprising an encoder portion and a decoder portion configured to:
    process a photorealistic content image by a sequence of processing layers within the encoder portion to extract content features from the photorealistic content image, wherein each processing layer includes a max pooling layer that generates location data identifying a location of a maximum value of the content features output by the processing layer;
    process an output of the encoder portion based on style features extracted from a photorealistic style image to produce a transformed feature map; and
    processing the transformed feature map by a sequence of decoder processing layers within the decoder portion to produce a stylized photorealistic image including content from the photorealistic content image that is modified according to the photorealistic style image, wherein an unpooling layer within each decoder processing layer uses the location data generated by a corresponding one of the max pooling layers to process the transformed feature map.

10. The system of claim 9, further comprising a smoothing function module configured to process the stylized photorealistic image according to pixel similarity data for the photorealistic content image to produce a smoothed stylized photorealistic image.

11. The system of claim 10, wherein the pixel similarity data identifies pixels in the stylized photorealistic image that are consistent in color with adjacent pixels.

12. The system of claim 10, wherein a quadratic function with a closed-form solution is solved to produce the smoothed stylized photorealistic image.

13. The system of claim 10, wherein the pixel similarity data comprises pixel affinity values.

14. The system of claim 9, further comprising a second photo style transfer neural network model configured to process the photorealistic style image to produce an improved photorealistic style image, wherein the second photo style transfer neural network model has lower feature representation compared with the photo style transfer neural network model.

15. The system of claim 9, wherein the photorealistic style image is segmented into a first style region and a second style region and the photo style transfer neural network model processes the first style region and a corresponding first content region of the photorealistic content image to produce a first region of the photorealistic style image.

16. The system of claim 9, wherein the photorealistic content image is segmented into a first content region and a second content region and the photo style transfer neural network model processes the first content region and a corresponding first style region of the photorealistic style image to produce a first region of the photorealistic style image.

17. A non-transitory, computer-readable storage medium storing instructions that, when executed by a processing unit, cause the processing unit to:
- process a photorealistic content image by a sequence of processing layers within an encoder portion of a photo style transfer neural network model to extract content features from the photorealistic content image, wherein each processing layer includes a max pooling layer that generates location data identifying a location of a maximum value of the content features output by the processing layer;
- process an output of the encoder portion based on style features extracted from a photorealistic style image to produce a transformed feature map; and
- processing the transformed feature map by a sequence of decoder processing layers within the decoder portion of the photo style transfer neural network model to produce a stylized photorealistic image including content from the photorealistic content image that is modified according to the photorealistic style image, wherein an unpooling layer within each decoder processing layer uses the location data generated by a corresponding one of the max pooling layers to process the transformed feature map.

* * * * *